United States Patent [19]

Eschenfelder et al.

[11] Patent Number: 4,583,891

[45] Date of Patent: Apr. 22, 1986

[54] STRUCTURAL COMPONENT HAVING A TWISTED PROFILE AND METHOD AND APPARATUS FOR PRODUCING SUCH STRUCTURAL COMPONENT

[75] Inventors: Peter Eschenfelder, Waldkraiburg; Jörg Quentin, Munich, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 680,583

[22] Filed: Dec. 10, 1984

Related U.S. Application Data

[63] Continuation of Ser. No. 436,312, Oct. 25, 1982, abandoned.

[30] Foreign Application Priority Data

Nov. 5, 1981 [DE] Fed. Rep. of Germany ....... 3143846

[51] Int. Cl.$^4$ .............................................. B23C 3/18
[52] U.S. Cl. ...................................... 409/120; 51/126; 51/127; 144/144 B; 409/202; 409/212
[58] Field of Search ............... 409/120, 201, 202, 211, 409/212; 51/126, 127; 144/144 B, 144.5 GT, 152

[56] References Cited

U.S. PATENT DOCUMENTS 2,742,824 4/1956 Watson et al. ................. 409/120 X

FOREIGN PATENT DOCUMENTS 306427 4/1955 Switzerland ..................... 409/212
767676 2/1957 United Kingdom ............... 409/120
773319 4/1957 United Kingdom ............... 409/120

Primary Examiner—Z. R. Bilinsky
Attorney, Agent, or Firm—W. G. Fasse; D. H. Kane, Jr.

[57] ABSTRACT

A structural component having a twisted profile or cross-section, such as a large scale wing for a windmill or for a helicopter, has an upper portion and a lower portion intimately bonded to each other along an interface formed by two separation surfaces. A longitudinal axis extends in said interface. The interface is defined by simultaneously twisting or rotating and longitudinally moving a polygonal line (PZ) relative to the longitudinal axis while a central portion of the polygonal line extends perpendicularly to the central axis. The machine tool for machining the separation surfaces has a tool carrier (14), and a carrier support (20) for holding the tool carrier (14) in such a manner that the tool carrier is tiltable about the longitudinal axis of the interface. Simultaneously the carrier support is movable in the direction of the longitudinal axis (A).

5 Claims, 4 Drawing Figures

STRUCTURAL COMPONENT HAVING A TWISTED PROFILE AND METHOD AND APPARATUS FOR PRODUCING SUCH STRUCTURAL COMPONENT

This application is a continuation of application Ser. No. 436,312, filed Oct. 25, 1982, now abandoned.

CLAIM TO PRIORITY

The present invention is based on German Ser. No. P 31 43 846.6, filed in the Federal Republic of Germany on Nov. 5, 1981. The priority of the German filing date is claimed for the present application.

BACKGROUND OF THE INVENTION

The invention relates to a structural component having a twisted profile and to a method and apparatus for producing such a structural component, especially a large scale structural component such as the wings of a windmill or a helicopter rotor blade. Such structural components have two portions which are intimately bonded to each other along an interface surface.

It is known to use a foam material in the construction of helicopter rotor blades for providing a load take-up structure and for transferring shearing forces as well as torsion loads. A foam material known under the tradename "Conticell 40" is suitable for this purpose. Since the wing depth measured vertically and perpendicularly to the longitudinal axis of a helicopter rotor blade or wing is constant over substantial portions of the rotor blade length, for example, over the entire profiled portion of the wing, it is possible to use a so-called profile cylinder of foam material which is also referred to as a foam core. In helicopter rotor blades the use of such a foam core is further facilitated by the fact that the blade construction is substantially constant or uniform over the mentioned range. Merely at the wing tip is it necessary to use a foam core potion having the shape of a profiled cone. However, such profiled cone makes the production substantially more difficult because it requires, for example, so-called copy milling by a machine tool.

Further, in a relatively small helicopter rotor wing there is no interface between two portions of the wing because the shape of the wing is determined by the compression resulting from moving two mold halves together at a time when the laminations impregnated with a resin material are still moist or at least at a time when the curing of the resin material merely resulted in a gel type consistency.

On the other hand, in connection with large scale structural components such as windmill wings, wings for glider airplanes, and large helicopter blades, the foam core must be replaced by a shearing member capable of taking up the high shearing forces to which such large scale structural components are exposed during operation. Such shearing member has been shaped heretofore by manual operations, for example, sanding operations, in order to adapt the shape of the shearing member to the shape of the upper and lower shell of the respective wing. Manufacturing steps performed by hand may be acceptable where the number of components to be produced is relatively small, and further provided that the size of the structural component involved is still manually managable. However, where larger production numbers are involved or where the size of the structural component becomes too large for manual operations, the prior art does not provide any solutions to the problems involved under such circumstances.

Furthermore, in connection with large scale rotor blades as they are used, for example, in wind energy converters comprising windmills, it is desirable to use a foam core even in such large scale components in order to reduce the weight of the rotor structure as long as the shearing loads are small enough to be handled by a foam core. However, due to the large size of such blades, it is necessary to first manufacture the blade in two portions, for example, as an upper shell and a lower shell which are then intimately bonded to each other along an interface formed by the two separation surfaces of the two wing portions. These separation surfaces require a precision machining prior to the bonding so that an intimate bonding is assured along the surface of the entire interface. Due to the large twisting of such a blade along its length, it is necessary that the mentioned interface and thus also the two separation surfaces which after the bonding form the interface, are also having the same twisting.

Heretofore, it has been difficult, time consuming, and hence expensive to properly machine these separation surfaces forming the interface between the two blade portions. Especially to be mentioned is the substantial control apparatus required for such machining. Furthermore, large tolerances had to be accepted due to angular errors. Additionally, the machine tool set up required a substantial number of man hours to be performed by highly skilled tool setters. Moreover, the manufacturing control required a substantial measuring effort involving the use of precision measuring techniques and equipment.

OBJECTS OF THE INVENTION

In view of the foregoing, it is the aim of the invention to achieve the following objects singly or in combination:

To provide a method and apparatus for the production of a large scale structural component of the type described above, whereby the separation surfaces are positively defined by relatively simple means so that a much simplified machining of these twisted separation surfaces is assured;

To provide an apparatus which is easily adjusted for the machining of a surface which is twisted relative to a fixed longitudinal axis extending in such surface; and to provide a large scale structural component having initially two separate portions with respective separation surfaces of a twisted configuration, yet so machined that these configurations will be bonded to each to form an interface of sufficient strength.

SUMMARY OF THE INVENTION

According to the invention there is provided a method for defining a twisted surface along the length of a twisted structural component portion or for defining a twisting interface between two such portions of a longitudinal structural component having a twisted profile or cross-section. First, a longitudinal fixed axis is established which extends in the interface or in the respective separation surface. A polygonal line is then defined to have a plurality of sections including a central section extending perpendicularly to the longitudinal axis. The so established polygonal line is then rotated about the longitudinal fixed axis while simultaneously the line is being moved along the longitudinal axis. Since the shape of the polygonal line as well as its rotation about the longitudinal axis and its longitudinal translation are known, the twisted surface is completely defined along the entire length of the structural component.

According to the invention there is further provided a machine tool for machining a twisting separation surface forming an interface between first and second portions of a longitudinal structural component having a twisted profile or cross-section. The machine tool according to the invention comprises a first stationary support for holding a structural component portion having an interface or separation surface to be machined. A second movable support means is movable back and forth in the direction of the longitudinal axis which extends in the separation or interface surface. A first carrier means is operatively secured to the second movable support means. A second carrier means for a tool is connected by first and second guide means in a tiltable manner to the first carrier means, whereby a tool may be tilted relative to or around the longitudinal axis and simultaneously the tool is movable in the direction of the longitudinal axis.

The method and apparatus according to the invention achieve the following advantages. A single longitudinal guide is sufficient for each separation surface. The angular errors have been minimized so that very small tolerances may be maintained in the machined surface. The fitting error between two separation surfaces forming an interface between the portions of a large scale structural component is small because only a longitudinal guide means and a tilting guide means are required to be adjusted relative to each other. Further, the control of the machine tool has been substantially simplified because the surface quality and its configuration may now easily be tested by replacing the machining tool by a measuring mechanism.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1A:
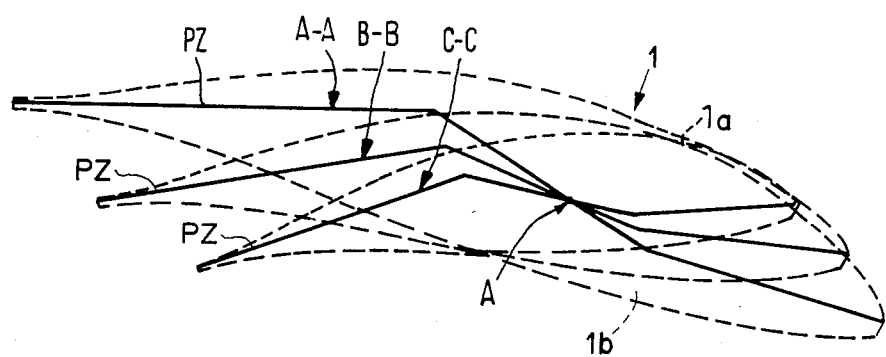
FIG. 1a shows three sections in a schematic manner located one behind the other relative to the plane of the drawing, through a large wing.
Figure 1B:
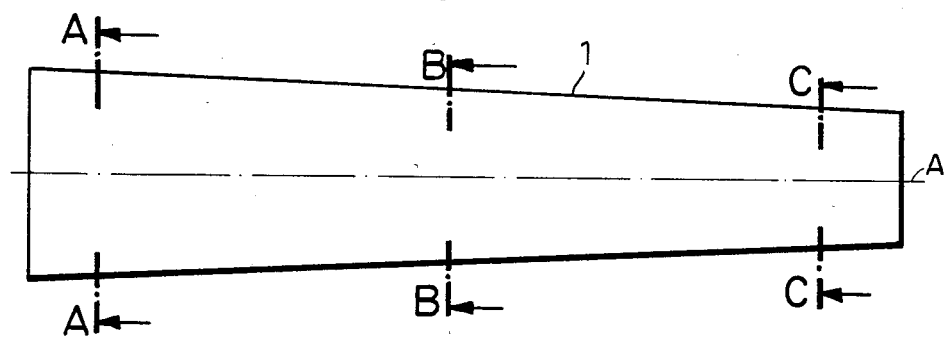
FIG. 1b shows a top plan view onto a large scale wing such as a windmill wing.

FIG. 1b shows a schematic top plan view of a large scale wing such as a windmill wing or blade. The blade 1 has a central longitudinal axis A which is fixed in the blade 1. Three different sections A—A, B—B, and C—C are taken perpendicularly through the blade 1 as shown in FIG. 1b. These sections are shown in FIG. 1a, whereby the view is in the direction of the arrows indicating the sectional plane. In other words, the section C—C appears first to the viewer. The section B—B appears next behind the first section and the section A—A is the last one in the row.

According to the invention a polygonal line PZ is employed to define an interface between an upper portion 1a and a lower portion 1b of the wing blade 1. In FIG. 1a the interface is defined by moving the polygonal line PZ along the axis A which extends perpendicularly to the plane of the drawing and by simultaneously tilting the polygonal line PZ around the longitudinal fixed axis A. The resulting interface surface is twisted relative to the longitudinal axis A. The polygonal line PZ has a plurality of corners, for example, two corners as shown and the central section of the line extends perpendicularly to the longitudinal axis in the plane of the drawing.

Figure 2:
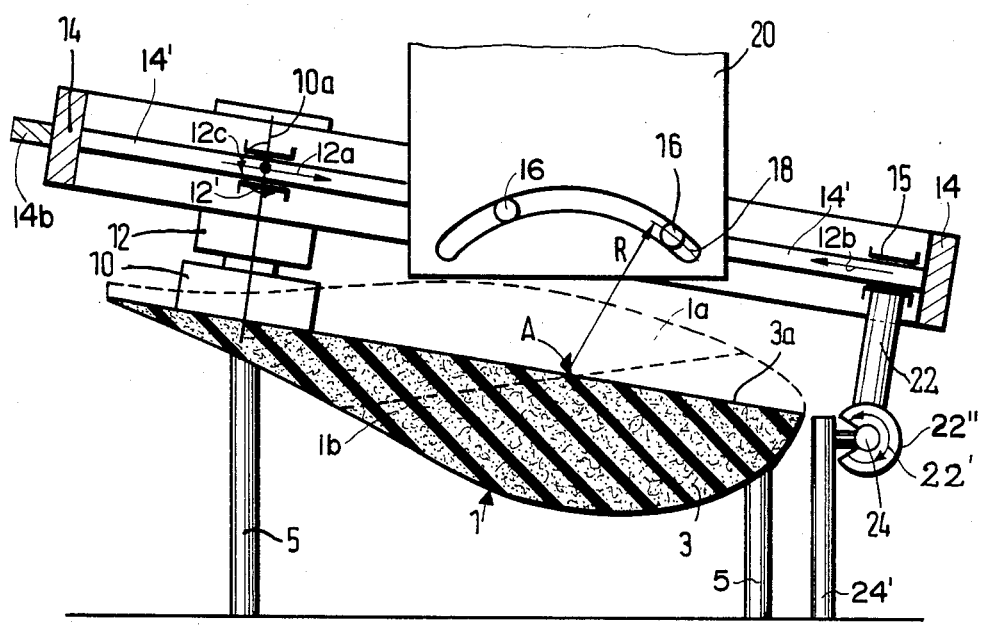
FIG. 2 shows a front view of an apparatus according to the invention with the view extending in the direction of the longitudinal axis of a structural component.

FIG. 2 shows a front view of an apparatus according to the invention for performing the present method when manufacturing a large scale structural component according to the invention. The lower portion 1b of the wing blade 1 is shown in full lines and the upper portion 1a is merely shown in dashed lines because the upper portion is normally not present in the machine when the lower portion is being machined and vice versa. The lower portion 1b has a foam core 3 and an interface forming surface 3a to be machined. The central fixed longitudinal axis A again extends perpendicularly to the plane of the drawing. The lower wing portion 1b rests on first stationary work piece support means 5 such as a machine tool table.

The interface forming surface 3a may, for example, be a plane surface not twisted in space. The present apparatus is equally suitable for machining such a plane surface.

Figure 3:
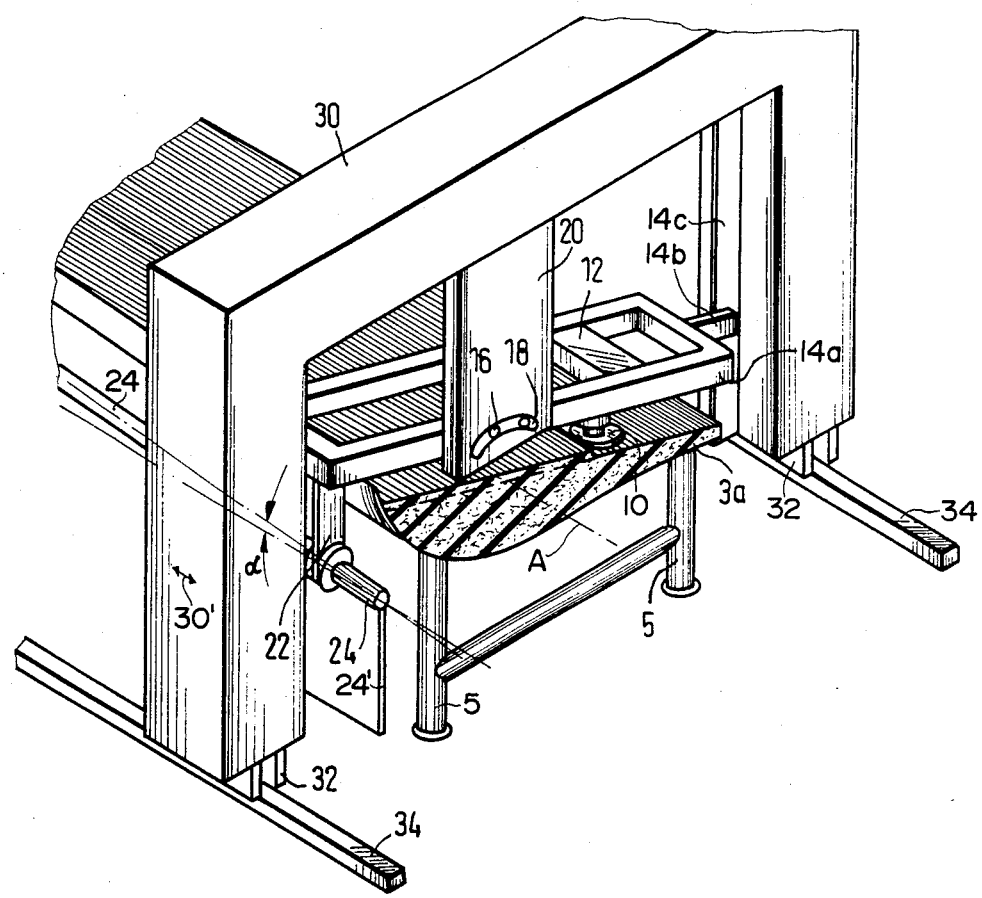
FIG. 3 shows a perspective view of an apparatus according to the invention, similar to FIG. 2.

According to the invention a milling tool 10 such as a milling cutter is rotatable around an axis 10a. In addition to the first stationary support means 5 rigidly secured to the shop floor, the present apparatus comprises second movable support means in the form of a gantry 30 shown in FIG. 3 and including a holding arm 20 extending down from the gantry and movable with the gantry back and forth in the direction of the longitudinal axis A guided by guides 32 movable on rails 34 as shown in FIG. 3. The arm 20 forms a first carrier means which cooperates with a second carrier arm 14 for carrying the tool support 12 which in turn supports the tool 10. First and second guide means 16 and 18 connect the tool carrying arm 14 to the holding arm 20. The first guide means comprise, for example, two roller bolts 16 which slide in second guide means in the form of an accurate arcuate guide slot 18 of the arm 20. The roller bolts 16 are secured to the support arm 14. The guide slot 18 is circular and has a radius of curvature R having its origin in the fixed longitudinal axis A. Therefore, the arm 14 tilts around the axis A as shown in FIG. 2. Third guide means include a guide leg 22 and a guide rail 24. Guide leg 22 connects one end of the tool support arm or carrier 14 to the guide rail 24 which is arranged at an angle α, as shown in FIG. 3, whereby the arm 14 is tiltable back and forth about the longitudinal axis A, because the upper end of the guide leg 22 is operatively secured to the arm 14 by a thrust bearing 15 which permits relative movement between the leg 22 and the arm 14.

The tool support 12 is movably secured to the arm 14 for movement longitudinally on the arm 14 as indicated by the arrows 12a and 12b. For this purpose the tool support 12 may be slidable for example along a slot 14' of the arm 14. Further, the tool support 12 is tiltable relative to the arm 14 as indicated by the arrow 12c. For this purpose the tool support 12 is secured to the arm 14 by a journal bearing 12'. The just described structure is capable of guiding the tool 10 along a plane surface or along a surface which is curved in space due to said tilting of a polygonal line PZ relative to or around the longitudinal axis A while simultaneously moving said polygonal line PZ along the longitudinal axis A.

Referring to FIG. 3 the gantry 30 is movable back and forth longitudinally of the longitudinal axis A as indicated by the double arrow 30'. The guide members 32 move for this purpose along the guide rails 34 as mentioned. The carrier arm 14 may be constructed as a frame member 14a as shown in FIG. 3, whereby the free end 14b is guided up or down by a vertical guide member 14c forming part of one leg of the gantry 30 as shown in FIG. 3. The frame member 14a is tiltable about the longitudinal axis A as controlled by the guide rail 24 in accordance with the tilting angle $\alpha$ which simultaneously defines the twisting of the surface to be machined. The guide rail 24 is rigidly secured to the flow on a support 24' so as to define the tilting angle $\alpha$ as shown in FIG. 3.

The details of the movability of the tool support 12 have been described above and are not shown in FIG. 3.

In operation the tool 10 rotates about the axis 10a driven by a motor gear mechanism of conventional construction and therefore not shown. Additionally, the tool moves along the frame member 14a and also tilts relative to the frame member 14a while simultaneously following the tilting movements of the frame member 14a about the axis A as permitted by the first and second guide means 16 and 18 and by the third guide means including the guide rail 24 to which the frame member 14a is secured by the guide leg 22 as described above. Additionally, the tool 10 follows the longitudinal movement of the gantry 30 in the direction of the axis A. Thus, the tool 10 is able to follow any contour of a surface twisted in space.

Although the invention has been described with reference to specific example embodiments, it will be appreciated, that it is intended, to cover all modifications and equivalents within the scope of the appended claims.

What is claimed is:

1. A machine tool for machining a twisting separation surface forming an interface between first and second portions of a longitudinal structural component having a twisted profile or cross-section, comprising first stationary support means for holding a structural component portion having an interface surface to be machined, said structural component having a fixed longitudinal axis, second movable support means movable back and forth in the direction of said longitudinal axis, first carrier means operatively secured to said second movable support means, second carrier means operatively carried by said first carrier means for carrying a tool, first and second guide means connecting said second carrier means in a tiltable manner to said first carrier means for tilting a tool secured to said second carrier means about said longitudinal axis, said second movable support means simultaneously moving said second carrier means in the direction of said longitudinal axis of said structural component, said machine tool further comprising third guide means including a stationary guide member extending alongside said structural component portion, said stationary guide member being arranged at an angle ($\alpha$) relative to a horizontal in parallel to said longitudinal axis, said third guide means further including a guide leg movable with said second carrier means, thrust bearing means movably securing an upper end of said guide leg to said second carrier means, journal means connecting a lower end of said guide leg to said stationary guide member, whereby said guide leg moves up or down in accordance with said angle ($\alpha$) as said second movable support means move back and forth for tilting said second carrier means about said longitudinal axis as permitted by said thrust bearing means and by said journal means in response to a back and forth movement of said second movable support means.

2. The machine tool of claim 2, wherein said second guide means comprise two roller bolts rigidly secured to said second carrier means, and wherein said first guide means comprise a slot forming a portion of a circular shape in said first carrier means, said roller bolts engaging said circular portion slot for guiding the tilting movement of said second carrier means, said circular portion slot having a radius of curvature with its origin in said fixed longitudinal axis.

3. The apparatus of claim 1, further comprising tool holder means, first means slidably securing said tool holder means to said second carrier means and second means tiltably securing said tool holder means to said second carrier means.

4. The apparatus of claim 3, further comprising a milling tool held for rotation by said tool holder means.

5. The apparatus of claim 1, wherein said second movable support means comprise a gantry type structure having support legs and a horizontal beam extending substantially across said interface surface, and rail means on which said second movable support means are movable back and forth in the direction of said longitudinal axis.

* * * * *

UNITED STATES PATENT AND TRADEMARK OFFICE
CERTIFICATE OF CORRECTION

PATENT NO. : 4,583,891

DATED : April 22, 1986

INVENTOR(S) : Peter Eschenfelder, Joerg Quentin

It is certified that error appears in the above-identified patent and that said Letters Patent is hereby corrected as shown below:

Column 4, line 48, delete "accurate";
line 51, delete "Therefore, the";
line 52, delete "arm 14 tilts around the axis A as shown in Fig. 2.";
line 54, replace "Guide" by --The guide--, delete "one end of";
line 58, replace "operatively" by --rigidly--;
line 59, replace "which" by --, and because the lower end of the guide leg 22 is secured to the guide rail 24 by a journal bearing 22" permitting a sliding of the guide leg 22 axially along the guide rail 24 and a tilting of the guide leg 22 around the guide rail 24 as indicated by the double arrow 22'.--;
line 60, delete "permits relative movement between the leg 22 and the";
line 61, delete "arm 14.".

Column 5, line 13, delete "up or down", delete "vertical";
lines 16 and 17, replace "as controlled by the guide rail 24 in accordance with the tilting" by --due to the--, before "which" insert --as mentioned above--,
line 20, replace "flow" by --floor--, after "support" insert --member--, replace "so as to define the tilting" by --, also shown in Fig. 2 but with said angle $\alpha$ as shown in Fig. 3.--.

UNITED STATES PATENT AND TRADEMARK OFFICE
CERTIFICATE OF CORRECTION

PATENT NO. : 4,583,891

DATED : April 22, 1986

INVENTOR(S) : Peter Eschenfelder, Joerg Quentin

It is certified that error appears in the above-identified patent and that said Letters Patent is hereby corrected as shown below:

Claim 2, (column 6, line 28), replace "claim 2" by --claim 1--.

Signed and Sealed this

Sixteenth Day of December, 1986

Attest:

DONALD J. QUIGG

*Attesting Officer*  *Commissioner of Patents and Trademarks*